United States Patent
Guo et al.

(10) Patent No.: US 10,649,301 B2
(45) Date of Patent: May 12, 2020

(54) DISPLAY PANEL, MANUFACTURING METHOD THEREOF AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Qingsen Guo, Beijing (CN); Yongzhi Song, Beijing (CN); Bo Zhou, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/179,023

(22) Filed: Nov. 2, 2018

(65) Prior Publication Data
US 2019/0285959 A1  Sep. 19, 2019

(30) Foreign Application Priority Data
Mar. 13, 2018 (CN) .......................... 2018 1 0205748

(51) Int. Cl.
*G02F 1/163* (2006.01)
*G09G 3/38* (2006.01)

(52) U.S. Cl.
CPC .............. *G02F 1/163* (2013.01); *G09G 3/38* (2013.01); *G02F 2201/44* (2013.01)

(58) Field of Classification Search
CPC ........ G02F 1/163; G02F 2201/44; G09G 3/38
See application file for complete search history.

(56) References Cited

U.S. PATENT DOCUMENTS

2015/0338714 A1* 11/2015 Li ..................... G02F 1/133514
349/43
2016/0033842 A1  2/2016 Shi et al.

FOREIGN PATENT DOCUMENTS

| CN | 102944952 A | 2/2013 |
| CN | 103529615 A | 1/2014 |
| CN | 104749837 A | 7/2015 |
| CN | 106019756 A | 10/2016 |

OTHER PUBLICATIONS

Chinese Office Action in corresponding Chinese Application No. 201810205748.3 dated Jun. 5, 2019 (an English translation attached hereto). 17 pages.

* cited by examiner

*Primary Examiner* — Thanh Nhan P Nguyen
(74) *Attorney, Agent, or Firm* — Leason Ellis LLP (57) ABSTRACT

Embodiments of the present disclosure provide a display panel, a manufacturing method thereof and a display device. The display panel includes: a first substrate and a second substrate which are cell-assembled; a liquid crystal layer, disposed between the first substrate and the second substrate; a spacer layer, disposed between the liquid crystal layer and the first substrate; and an electrochromic layer, disposed between the first substrate and the spacer layer.

15 Claims, 6 Drawing Sheets

DISPLAY PANEL, MANUFACTURING METHOD THEREOF AND DISPLAY DEVICE

CROSS-REFERENCE TO RELATED PATENT APPLICATIONS

The present application claims the priority of Chinese Patent Application No. 201810205748.3 filed on Mar. 13, 2018, which is incorporated herein by reference in its entirety.

TECHNICAL FIELD

At least one embodiment of the present invention relates to a display panel, a manufacturing method thereof and a display device.

BACKGROUND

With the development of society, electronic display products are adopted widely, and users have a higher requirement on the display effect of the display products. Herein, contrast is an important parameter to measure display images of the display product. High-contrast display images can give users a better visual experience. The current electronic display product will have the phenomenon of light leakage in the case of dark-state display, so that the display images cannot meet the expected minimum brightness requirement, and it is difficult for display images with higher contrast to display.

SUMMARY

At least one embodiment of the present disclosure provides a display panel, the display panel includes: a first substrate and a second substrate which are cell-assembled; a liquid crystal layer, disposed between the first substrate and the second substrate; a spacer layer, disposed between the liquid crystal layer and the first substrate; and an electrochromic layer, disposed between the first substrate and the spacer layer.

At least one embodiment of the present disclosure provides a display device, the display device comprises the display panel as mentioned above.

At least one embodiment of the present disclosure provides a method for manufacturing a display panel, the method comprises: providing a first substrate; forming an electrochromic layer on the first substrate; forming a spacer layer on the first substrate on which the electrochromic layer is formed; and providing a second substrate, cell-assembling the first substrate and the second substrate, and forming a liquid crystal layer between the first substrate and the second substrate, wherein the spacer layer is disposed between the liquid crystal layer and the electrochromic layer.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Reference numerals of the accompanying drawings:
100—first substrate; 200—second substrate; 300—liquid crystal layer; 400—spacer layer; 410—buffer layer; 420—gate insulating layer; 430—interlayer dielectric layer; 440—passivation layer; 510—electrochromic layer; 511—electrochromic unit; 520—electrochromic control electrode; 521—first electrode; 522—second electrode; 600—liquid crystal control electrode; 610—pixel electrode; 620—common electrode; 700—thin-film transistor (TFT); 710—gate electrode; 720—source electrode; 730—drain electrode; 810—gate line; 820—data line; 830—common electrode line; 900—alignment layer; 1000—display panel; 1100—pixel unit; 1110—display region; 1120—non-display region; 1200—black matrix (BM); 1300—color filter (CF) layer.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," or the like are only used to indicate relative position relationship, and when the position of the object which is described is changed, the relative position relationship may be changed accordingly.

In a liquid crystal display (LCD) panel, the light extracting rate of the display panel is controlled by controlling rotation of liquid crystal, and the grayscale of display images is adjusted. As for the current display panel, in the case of dark-state display, rotation of liquid crystal does not make the light to be completely blocked, resulting in the light leakage of the display panel. Thus, the contrast of the display panel is reduced, and then the display effect of the display panel is affected.

At least one embodiment of the present invention provides a display panel, which comprises: a first substrate and a second substrate which are cell-assembled and a liquid crystal layer disposed between the first substrate and the second substrate; a spacer layer disposed between the liquid crystal layer and the first substrate; and an electrochromic layer disposed between the first substrate and the spacer layer. For instance, the spacer layer is disposed on the first substrate, and the electrochromic layer is disposed on the first substrate. In the case of dark-state display of the display panel, the electrochromic layer can absorb light incident into the display panel, so that the light can be also blocked even in the case of insufficient rotation of liquid crystal or defect. Thus, the light leakage of the display panel can be avoided, and then the contrast of display images of the display panel can be improved. Moreover, the spacer layer can prevent ions in the electrochromic layer from intruding into the liquid crystal layer, so as to protect the performance of liquid crystal molecules in the liquid crystal layer and improve the display yield of the display panel.

Description will be given below to a display panel, a manufacturing method thereof and a display device, provided by at least one embodiment of the present invention, with reference to the accompanying drawings.

Figure 1:
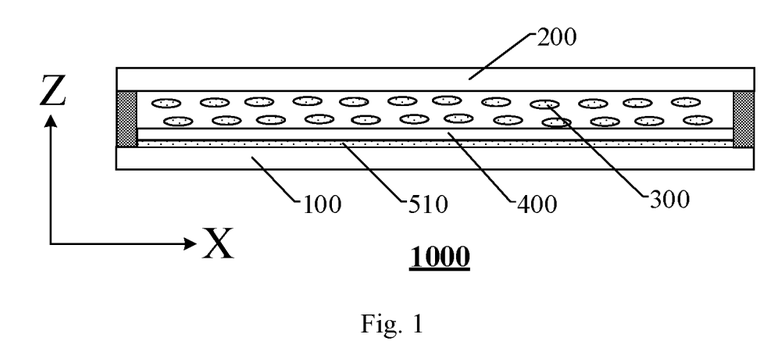
FIG. 1 is a cross sectional view of a display panel provided by an embodiment of the present invention.

FIG. 1 is a sectional view of a display panel provided by an embodiment of the present invention. For instance, in at least one embodiment of the present invention, as shown in FIG. 1, the display panel 1000 comprises: a first substrate 100 and a second substrate 200 which are cell-assembled and a liquid crystal layer 300 disposed between the first substrate 100 and the second substrate 200; a spacer layer 400 disposed on the first substrate 100 and between the liquid crystal layer 300 and the first substrate 100; and an electrochromic layer 510 disposed on the first substrate 100 and between the first substrate 100 and the spacer layer 400. In the case of dark-state display of the display panel 1000, the electrochromic layer can absorb light incident into the display panel 1000, so as to prevent the light leakage of the display panel 1000 and improve the contrast of display images of the display panel 1000. Moreover, the spacer layer 400 can prevent ions in the electrochromic layer from intruding into the liquid crystal layer 300, so as to improve the display yield of the display panel 1000.

In at least one embodiment of the present invention, as shown in FIG. 1, directional description will be given to the position of structures in the display panel by establishing a spatial rectangular coordinate system based on a plane in which the first substrate 100 is located. For instance, in the spatial rectangular coordinate system, a plane in which X and Y axes are located is parallel to the plane in which the first substrate 100 is located, wherein the specific directions of the X and Y axes are not limited, and a direction of Z axis is perpendicular to the plane in which the first substrate 100 is located. In addition, "upper" and "lower" are distinguished by a distance from the first substrate 100 along the Z-axis direction. Illustratively, taking the electrochromic layer 510 in FIG. 1 as an example, the electrochromic layer 510 is disposed below the liquid crystal layer 300, and the liquid crystal layer 300 is disposed above the electrochromic layer 510; and a surface of the electrochromic layer 510 close to the first substrate 100 is a lower surface of the electrochromic layer 510, and a surface of the electrochromic layer 510 away from the first substrate 100 is an upper surface of the electrochromic layer 510.

Figure 3:
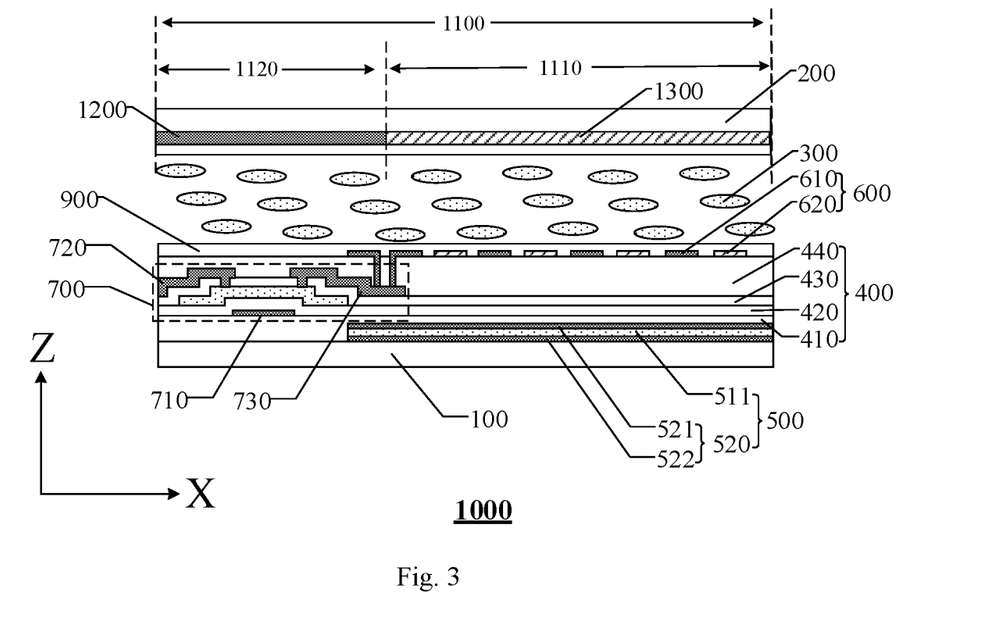
FIG. 3 is a partial sectional view of a display panel provided by an embodiment of the present invention.

For instance, the display panel provided by at least one embodiment of the present invention further comprises: a liquid crystal control electrode, disposed between the spacer layer and the second substrate and configured to control an electrical field applied to the liquid crystal layer; and an electrochromic control electrode, disposed between the spacer layer and the first substrate and configured to control an electrical field applied to the electrochromic layer. For instance, the liquid crystal control electrode can adjust the state of the liquid crystal layer (e.g., rotation of liquid crystal molecules) by utilization of the generated electrical field. For instance, the electrochromic control electrode allows the electrochromic layer to switch between the transparent state and the dark-colored state by utilization of the generated electrical field. The liquid crystal control electrode and the electrochromic control electrode are separated by the spacer layer. Correspondingly, the spacer layer may increase a distance between the liquid crystal control electrode and the electrochromic control electrode, so as to reduce the parasitic capacitance generated between the liquid crystal control electrode and the electrochromic control electrode, or no parasitic capacitance is generated. In this way, the interference of the electrochromic control electrode on the electric field generated by the liquid crystal control electrode is reduced or eliminated; the control precision of the liquid crystal control electrode on the liquid crystal layer is improved; and the display effect of the display panel is improved. The specific position of the liquid crystal control electrode and the electrochromic control electrode, the control method of the liquid crystal control electrode on the liquid crystal layer, and the control method of the electrochromic control electrode on the electrochromic layer may refer to relevant description in the following embodiments (e.g., an embodiment as shown in FIG. 3). No further description will be given here.

Figure 2:
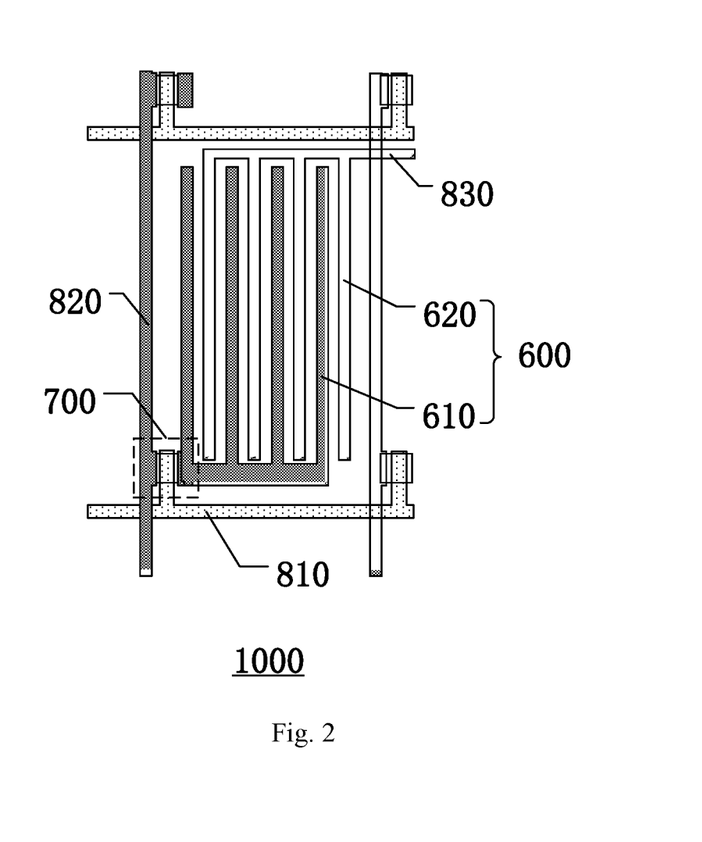
FIG. 2 is a partial schematic diagram of a display panel provided by an embodiment of the present invention.

For instance, the display panel provided by at least one embodiment of the present invention further comprises: a plurality of pixel units defined by a plurality of gate lines and a plurality of data lines, wherein the electrochromic layer includes a plurality of electrochromic units, and each pixel unit is provided with at least one electrochromic unit. In this case, the electrochromic units disposed in different pixel units can operate independently and will not interfere with each other, so as to further improve the contrast of the display images of the display panel. FIG. 2 is a partial schematic diagram of the display panel provided by an embodiment of the present invention. FIG. 3 is a partial cross-sectional view of the display panel provided by an embodiment of the present invention. Both FIG. 2 and FIG. 3 are partial schematic diagrams of one pixel unit of the display panel. Illustratively, as shown in FIGS. 1, 2 and 3, a pixel unit 1100 is defined by a gate line 810 and a data line 820; the electrochromic layer 510 includes a plurality of electrochromic units 511; and each pixel unit 1100 is provided with at least one electrochromic unit 511. The liquid crystal control electrode 600 may control the state of the liquid crystal layer 300 so as to obtain a display image. The electrochromic control electrode 520 may control the state (transparent state or dark-colored state) of the electrochromic unit 511, so as to solve the light leakage problem when the pixel unit is in dark state.

Description will be given below to the technical proposal in at least one embodiment of the present invention by taking the case that the electrochromic layer includes a plurality of electrochromic units and each pixel unit is provided with one electrochromic unit as an example. The electrochromic unit is one part of the electrochromic layer. Hereinafter, in each pixel unit, the electrochromic layer is represented by the electrochromic unit.

In at least one embodiment of the present invention, the specific structure and the position of the liquid crystal control electrode are not limited, as long as the liquid crystal control electrode is disposed on a side of the spacer layer away from the first substrate. Illustratively, as shown in FIGS. 2 and 3, the liquid crystal control electrode 600 includes a pixel electrode 610 and a common electrode 620; the pixel electrode 610 and the common electrode 620 are arranged on the same side of the liquid crystal layer 300; the electrical field may be formed after voltage is applied to the pixel electrode 610 and the common electrode 620; and the deflection of liquid crystals may be controlled by utilization of the electrical field. For instance, the pixel electrode 610 and the common electrode 620 may be disposed on a side of the liquid crystal layer 300 facing the first substrate 100 and may also be disposed on a side of the liquid crystal layer 300 facing the second substrate 200. For instance, the pixel electrode 610 and the common electrode 620 may be arranged in the same layer and may also be arranged in different layers. It should be noted that in at least one embodiment of the present invention, the pixel electrode and the common electrode may also be arranged on different sides of the liquid crystal layer. For instance, the pixel electrode may be disposed on a side of the liquid crystal layer facing the first substrate, and the common electrodes may be disposed on a side of the liquid crystal layer facing the second substrate.

For instance, in the display panel provided by at least one embodiment of the present invention, in each pixel unit, the electrochromic control electrode includes a first electrode and a second electrode, and the electrochromic unit is disposed between the first electrode and the second electrode. For instance, in a direction perpendicular to the plane in which the first substrate is located, the first electrode, the second electrode and the electrochromic unit are superimposed to each other. An electrical field may be generated after voltage is applied to the first electrode and the second electrode, and the electrochromic unit may switch between the transparent state and the dark-colored state by utilization of the electrical field. Illustratively, as shown in FIG. 3, the electrochromic control electrode 520 includes a first electrode 521 and a second electrode 522, and the electrochromic unit 511 is disposed between the first electrode 521 and the second electrode 522. The first electrode 521, the second electrode 522 and the electrochromic unit 511 form an electrochromic structure 500 together. After voltage is applied to at least one of the first electrode 521 or the second electrode 522, an electrical field is formed between the first electrode 521 and the second electrode 522, and the electrochromic unit 511 may switch between the transparent state and the dark-colored state under the influence of the electrical field. When corresponding pixel unit is required to emit light (the pixel unit is in the bright state), the electrochromic unit 511 is switched to be the transparent state. When the corresponding pixel unit does not need to emit light and the light leakage of the pixel unit must be prevented (the pixel unit is in dark state), the electrochromic unit 511 is switched to be the dark-colored state. Thus, the light leakage problem of the display panel can be solved in the case of not affecting the display performance of the display panel.

In at least one embodiment of the present invention, the material of the electrochromic unit is not limited. For instance, the materials of the electrochromic unit may be solid materials. For instance, the solid materials may be inorganic materials and may also be organic materials. The inorganic material may include transition metal oxide and derivatives thereof, e.g., tungsten oxide ($WO_3$), molybdenum oxide ($MoO_3$), nickel oxide (NiO) or iridium oxide (IrOx). The organic material may include redox type compound, metal chelate, conductive polymer, etc., for instance, viologen, phthalocyanine or polyaniline.

In at least one embodiment of the present invention, the materials of the first electrode and the second electrode are not limited, as long as the first electrode and the second electrode have certain light transmittance. For instance, the first electrode and the second electrode may be transparent electrodes. The material of the transparent electrode may include indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO), carbon nanotube, etc.

It should be noted that in at least one embodiment of the present invention, the switching mode of the electrochromic unit between the transparent state and the dark-colored state is affected by the potential difference of the electric field. For instance, in the display panel provided by at least one embodiment of the present invention, in each pixel unit, when the voltage on the first electrode is equal to the voltage on the second electrode, the electrochromic unit corresponding to the pixel unit is in transparent state, and corresponding pixel unit is in bright state; and when the voltage on the first electrode is unequal to the voltage on the second electrode, the electrochromic unit corresponding to the pixel unit is in dark-colored state, and corresponding pixel unit is in dark state. When the voltages on the first electrode and the second electrode are equal, or the potential difference between the first electrode and the second electrode is zero, the electrochromic unit is in transparent state; and when the voltages on the first electrode and the second electrode are unequal, or the potential difference between the first electrode and the second electrode is greater than zero or less than zero, the electrochromic unit will be switched to be dark-colored state.

It should be noted that in the embodiment of the present invention, the equal voltage on the first electrode and the second electrode may be that no voltage is applied to the first electrode and the second electrode, namely the applied voltage is zero; or the voltage applied to the first and second electrodes is equal.

For instance, in at least one embodiment of the present invention, the electrochromic unit may also have dark-colored state in an electrical field with the zero potential difference and have transparent state in an electrical field of which the potential difference is not zero. When the pixel unit is required to be in bright state, unequal voltages may be applied to corresponding first and second electrodes; the potential difference between the first electrode and the second electrode is not zero, the electrochromic unit in the electrochromic structure has transparent state, and the display state of the pixel unit will not be affected. When the pixel unit is required to be in dark state, voltage may be applied to at least one of corresponding first and second electrodes, or same voltage is applied to both, or no voltage is applied, so that the potential difference between the first electrode and the second electrode can be zero, and thus, the electrochromic unit in the electrochromic structure has dark-colored state, and then the light leakage of the pixel unit can be avoided.

The specific relationship between the switching of the operating state of the electrochromic unit and the electrical field is determined by the electrochromic material of the electrochromic unit. The operating state of the electrochromic unit may be designed according to the selected electrochromic material.

Description will be given below to the technical proposal in at least one embodiment of the present invention by taking the case that the electrochromic unit has transparent state in the electrical field of which the potential difference is zero and has dark-colored state in the electrical field of which the potential difference is not zero as an example.

In at least one embodiment of the present invention, the application manner of voltages to the first electrode and the second electrode in the electrochromic structure is not limited. For instance, in some embodiments of the present invention, the first electrode and the second electrode may be separately wired, so voltage signals on the first electrode and the second electrode are independently controlled and not affected by other structures in the display panel. For instance, in other embodiments of the present invention, at least one of the first electrode and the second electrode may be connected with other electrode structures, signal lines and the like in the display panel so as to share signals. Thus, the first electrode or the second electrode sharing the signal with other structures does not need to be additionally wired, so as to simplify the structure of the display panel and reduce the complexity of the voltage signal applied to the first electrode or the second electrode.

Illustratively, in some embodiments of the present invention, the first electrode and the second electrode may be separately wired, so the voltage signals on the first electrode and the second electrode are independently controlled and not affected by other structures in the display panel. For instance, in one pixel unit, when the pixel unit is required to be in bright state, same voltage or no voltage may be applied to corresponding first and second electrodes, so the potential difference between the first electrode and the second electrode is zero, and then the electrochromic unit in the electrochromic structure has transparent state and will not affect the display state of the pixel unit. When the pixel unit is required to be in dark state, voltage may be applied to at least one of corresponding first and second electrodes or unequal voltages are applied to both, so the potential difference between the first electrode and the second electrode is not zero, and then the electrochromic unit in the electrochromic structure has dark-colored state. Thus, the light leakage of the pixel unit can be prevented.

Description will be given below to several structures of the display panel by taking the case that the first electrode in the electrochromic structure shares the signal with other structures in the display panel as an example.

For instance, in the display panel provided by at least one embodiment of the present invention, the liquid crystal control electrode includes a pixel electrode and a common electrode; and in each pixel unit, the first electrode is electrically connected with one of the pixel electrode, the common electrode, the gate line and the data line. Voltage signals on the pixel electrode, the common electrode, the gate line and the data line are directly related to the display state of the pixel unit. Thus, the variation of the voltage signal on the first electrode connected with one of the above structures will also correspond to the display state of the pixel unit. In this way, the voltage signal on the second electrode may be set according to the display state of the pixel unit. It should be noted that the first electrode may also be electrically connected with other electrode structures or signal lines in the display panel. No limitation will be given here in the embodiment of the present invention.

Figure 4:
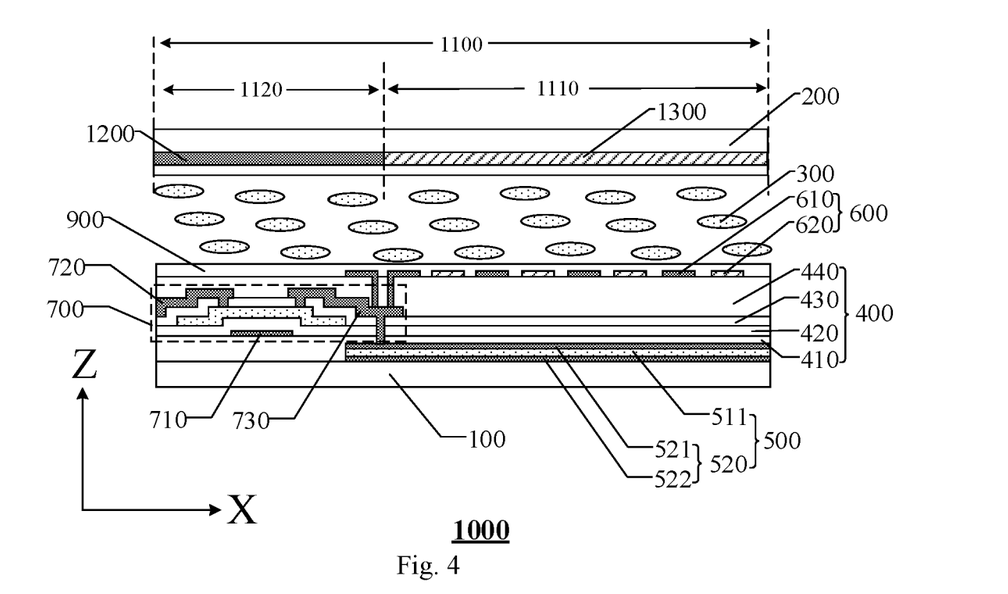
FIG. 4 is a partial sectional view of another display panel provided by an embodiment of the present invention.

For instance, in the display panel provided by at least one embodiment of the present invention, the first electrode is electrically connected with the pixel electrode. Moreover, in each pixel unit, when the voltage on the second electrode is equal to the voltage on the pixel electrode, corresponding pixel unit is in bright state; and when the voltage on the second electrode is unequal to the voltage on the pixel electrode, corresponding pixel unit is in dark state. FIG. 4 is a partial cross-sectional view of another display panel provided by one embodiment of the present invention. Illustratively, as shown in FIG. 4, the first electrode 521 is electrically connected with the pixel electrode 610. For instance, when the pixel unit displays the bright state, the pixel electrode 610 is applied with voltage. In this case, the same with the voltage signal on the pixel electrode 610 is applied to the second electrode 522, and thus, the potential difference between the first electrode 521 and the second electrode 522 is zero, the electrochromic unit 511 has transparent state and will not affect the display state of the pixel unit 1100. When the pixel unit displays the dark state, no voltage is applied to the pixel electrode 610, and in this case, any voltage signal may be applied to the second electrode 522; or voltage is applied to the pixel electrode 610, and in this case, the voltage signal, different from the voltage on the pixel electrode, is applied to the second electrode 522. Thus, the potential difference between the first electrode 521 and the second electrode 522 is not zero, so the electrochromic unit 511 has dark-colored state, and then the light leakage of the pixel unit 1100 can be prevented.

In at least one embodiment of the present invention, the first electrode and the pixel electrode may be directly connected and may also be electrically connected through another structure. For instance, in at least one embodiment of the present invention, as shown in FIG. 4, each pixel unit 1100 may be provided with at least one TFT 700, and the pixel electrode 610 may be connected with a drain electrode 730 of the TFT 700. For instance, the first electrode 521 may be connected with the drain electrode 730. In this way, the first electrode 521 and the pixel electrode 610 can also have same voltage signal. In addition, in the manufacturing process of the display panel, the electrical connection between the pixel electrode 610 and the first electrode 521 is realized via two through holes, and the pixel electrode 610 and the first electrode 521 are not required to be connected via one through hole, so the depth of each through hole can be reduced, and then the difficulty of the manufacturing process of the display panel can be reduced.

For instance, in at least one embodiment of the present invention, the electrochromic structure is disposed between the TFT and the first substrate. In this way, the arrangement of the electrochromic structure will not affect the manufacturing process of the TFT. In addition, the spacing distance between the electrochromic control electrode and the liquid crystal control electrode can also be further increased to reduce the parasitic capacitance generated between the liquid crystal control electrode and the electrochromic control electrode or eliminate the parasitic capacitance. Moreover, the thickness of the spacer layer between the electrochromic units and the liquid crystal layer can be further increased to further reduce the risk that ions in the electrochromic units invade into the liquid crystal layer.

Figure 5:
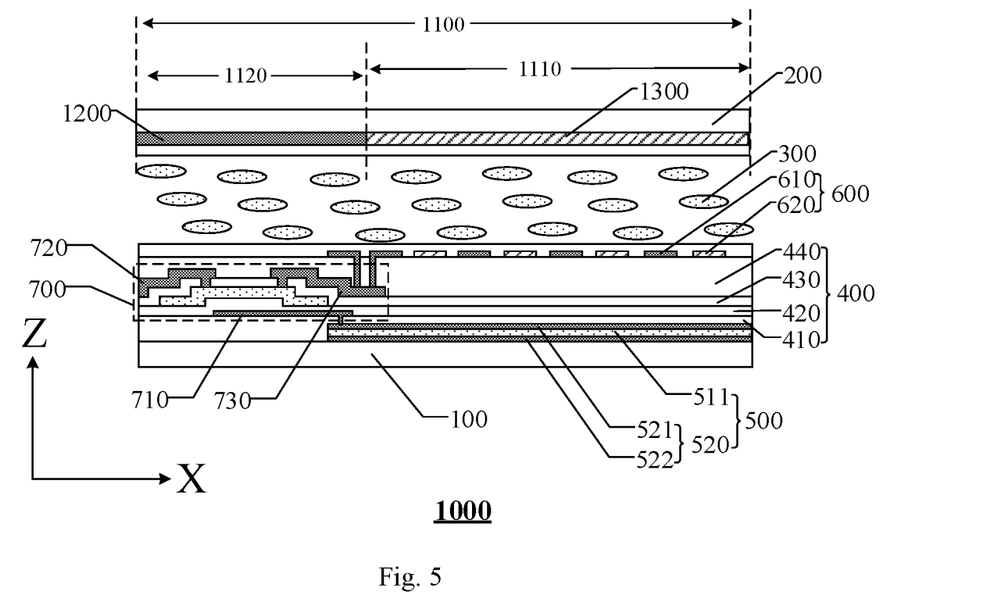
FIG. 5 is a partial sectional view of another display panel provided by an embodiment of the present invention.

For instance, in the display panel provided by at least one embodiment of the present invention, the first electrode is electrically connected with one of the gate line and the data line. Moreover, in each pixel unit, when the voltage on the second electrode is equal to the voltage on the first electrode, corresponding pixel unit is in bright state; and when the voltage on the second electrode is unequal to the voltage on the first electrode, corresponding pixel unit is in dark state. FIG. 5 is a partial cross-sectional view of another display panel provided by an embodiment of the present invention. Illustratively, as shown in FIGS. 2 and 5, a gate line 810 is electrically connected with a gate electrode 710 in the TFT 700, and a data line 820 is electrically connected with a source electrode 720 in the TFT 700. Description will be given below by taking the case that the gate line 810 and the gate electrode 710 are an integral structure and the data line 820 and the source electrode 720 are an integral structure as an example. For instance, the first electrode 521 is connected with the gate electrode 710 (the gate line 810). When the pixel unit 1100 is in bright state, voltage is applied to the gate electrode 710 so that the TFT 700 is turned on. In this way, voltage signal the same with that of the gate electrode 710 is applied to the second electrode 522, so that the potential difference between the first electrode 521 and the second electrode 522 is zero, and then the electrochromic unit 511 has transparent state and will not affect the display state of the pixel unit 1100. When the pixel unit 1100 is in dark state, any voltage signal different from the voltage signal on the gate electrode 710 is required to be applied to the second electrode 722, so that the potential difference between the first electrode 521 and the second electrode 522 is not zero, and then the electrochromic unit 511 has dark-colored state. Thus, the light leakage of the pixel unit 1100 can be prevented.

Figure 6:
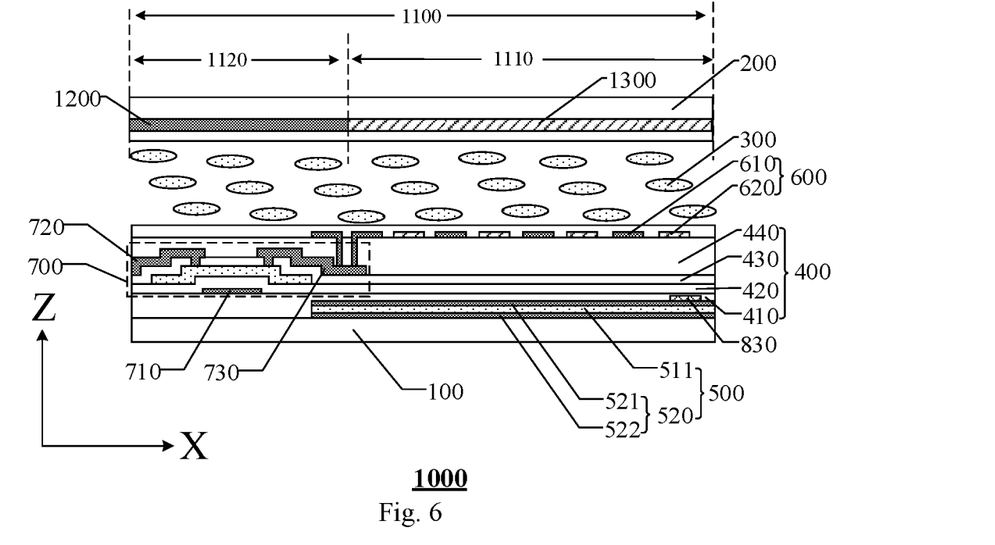
FIG. 6 is a partial sectional view of another display panel provided by an embodiment of the present invention.

For instance, in the display panel provided by at least one embodiment of the present invention, the first electrode and the common electrode are electrically connected. Moreover, in each pixel unit, when the voltage on the second electrode is equal to the voltage on the common electrode, corresponding pixel unit is in bright state; and when the voltage on the second electrode is unequal to the voltage on the common electrode, corresponding pixel unit is in dark state. In an embodiment of the present invention, no limitation will be given to the voltage signal on the common electrode. For instance, the voltage on the common electrode usually switches between high level (first voltage) and low level (second voltage), so that the liquid crystal molecules in the liquid crystal layer can maintain the reverse state, and then the liquid crystal molecules can be protected. FIG. 6 is a partial cross sectional view of another display panel provided by an embodiment of the present invention. Illustratively, as shown in FIG. 6, when the pixel unit 1100 is in bright state, voltage signal the same with that of the common electrode 620 is applied to the second electrode 522, so that the potential difference between the first electrode 521 and the second electrode 522 is zero, and then the electrochromic unit 511 has transparent state and will not affect the display state of the pixel unit 1100; and when the pixel unit 1100 is in dark state, any voltage signal different from the voltage signal on the common electrode 620 is required to be applied to the second electrode 522, so that the potential difference between the first electrode 521 and the second electrode 522 is not zero, and then the electrochromic unit 511 has dark-colored state. Thus, the light leakage of the pixel unit 1100 can be prevented. For instance, when the pixel unit 1100 displays the dark state, the voltage signal opposite to that of the common electrode 620 may be applied to the second electrode 522, that is to say, when the common electrode 620 has a first voltage, the second electrode 522 has a second voltage; or when the common electrode 620 has the second voltage, the second electrode 522 has the first voltage.

In an embodiment of the present invention, no limitation is given to a connection manner of the first electrode and the common electrode. For instance, in some embodiments of the present invention, when the common electrode is disposed between the liquid crystal layer and the electrochromic layer, through holes may be formed in structural layers such as the spacer layer between the first electrode and the common electrode to connect the first electrode and the common electrode. For instance, in other embodiments of the present invention, as shown in FIG. 6, the first electrode 521 may be connected with a common electrode line 830, and the common electrode line 830 is connected with the common electrode 620 to apply voltage signal to the common electrode 620. In this way, the first electrode 521 may be electrically connected with the common electrode 620. For instance, the first electrode 521 may also be integrally formed with the common electrode line 830. Illustratively, in the manufacturing process of the first electrode 521, a conductive material film may also be deposited on the first substrate 100 and then subjected to one patterning process to simultaneously obtain the first electrode 521 and the common electrode line 830.

For instance, in the display panel provided by at least one embodiment of the present invention, the pixel units are in one-to-one correspondence with the electrochromic units; each pixel unit includes a display region; an orthographic projection of the display region on the first substrate coincides with an orthographic projection of the electrochromic unit on the first substrate; or the orthographic projection of the display region on the first substrate falls within the orthographic projection of the electrochromic unit on the first substrate. Illustratively, as shown in FIG. 6, the pixel unit 1100 includes a display region 1110 and a non-display region 1120, and an orthographic projection of the display region 1110 on the first substrate 100 falls within the orthographic projection of the electrochromic unit 511 on the first substrate 100. Thus, when the pixel unit 1100 is in dark state, the electrochromic unit 511 may completely shield the light emitted towards the pixel unit 1100, so the light-shielding effect of the electrochromic unit 511 can be improved.

It should be noted that in at least one embodiment of the present invention, the positional relationship between the electrochromic unit and the pixel unit is not limited to the structure as shown in FIG. 6. For instance, the light leakage of the display panel may also be weakened when the orthographic projection of the electrochromic unit on the first substrate is partially overlapped with the orthographic projection of the display region on the first substrate, or the orthographic projection of the electrochromic unit on the first substrate falls within partial orthographic projection of the display region on the first substrate.

For instance, as shown in FIG. 6, the display panel 1000 may be provided with BM 1200. The BM 1200 is disposed in the non-display region 1120 and may define the position of the display region 1110 and the non-display region 1120 of the pixel unit 1100. For instance, the display panel 1000 has color display function, and a CF layer 1300 may be disposed in the display region 1110. For instance, the CF layer 1300 may be a red CF, a green CF, a blue CF, etc. For instance, in each pixel unit, as shown in FIG. 6, when the CF layer 1300 is only disposed in the display region 1110, the CF layer 1300 may be arranged in the same layer with the BM 1200; or for instance, in each pixel unit, the CF layer may be set to cover the display region and the non-display region, and in this case, the CF layer may be disposed on a side of the BM facing the liquid crystal layer or disposed on a side of the BM away from the liquid crystal layer.

It should be noted that in an embodiment of the present invention, FIG. 6 only illustratively shows the position and the size of the display region, but actually, the display region may be different from that as shown in FIG. 6. For instance, the size of the display region may be slightly greater than or slightly less than the size as shown in FIG. 6, and the position may also be slightly different. The distribution of the display region in each pixel unit is not limited to that as shown in FIG. 6. The size of the display region in each pixel unit may be designed according to actual demands.

For instance, in the display panel provided by at least one embodiment of the present invention, a surface of the spacer layer away from the first substrate is basically a plane. Illustratively, as shown in FIG. 6, a surface of the spacer layer 400 away from the first substrate 100 is basically a plane. For instance, in the manufacturing process of the display panel, when the spacer layer is formed, the spacer layer may be subjected to planarization. In this case, a part of the spacer layer 400 corresponding to the display region 1110 may have large thickness. Thus, the spacing distance between the liquid crystal control electrode 600 and the electrochromic control electrode 520 can be increased to further reduce or eliminate the parasitic capacitance generated between the liquid crystal control electrode 600 and the electrochromic control electrode 520, and then the display effect of the display panel can be improved.

In the embodiment of the present invention, a type of the spacer layer is not limited. For instance, the spacer layer may be additionally arranged, or an original structure in the display panel may be set to be the spacer layer; or an insulating layer may also be additionally arranged, and the insulating layer and the original structure in the display panel form the spacer layer together. For instance, in the display panel provided by at least one embodiment of the present invention, the spacer layer may include at least one of a buffer layer, a gate insulating layer, an interlayer dielectric layer, a passivation layer or a planarization layer. Illustratively, as shown in FIG. 6, a buffer layer 410, a gate insulating layer 420, an interlayer dielectric layer 430 and a passivation layer 440 may form the spacer layer 400. For instance, the passivation layer 440 may be subjected to planarization. In this way, the planarization layer may also be not required to be arranged on the passivation layer 440, so the structure and the manufacturing process of the display panel can be simplified, and the cost can be reduced.

It should be noted that in the embodiment of the present invention, the specific thickness of the spacer layer is not limited, as long as the spacer layer has the function of reducing or eliminating the parasitic capacitance generated between the liquid crystal control electrode and the electrochromic control electrode. For instance, in at least one embodiment of the present invention, the thickness of the spacer layer may be set to be not less than 300 nm, e.g., 400-600 nm, for instance, moreover, 450 nm, 500 nm, 550 nm, etc. When the thickness of the spacer layer falls within the above value range, the parasitic capacitance generated between the liquid crystal control electrode and the electrochromic control electrode can be effectively reduced, or no parasitic capacitance is generated between the liquid crystal control electrode and the electrochromic control electrode.

For instance, in at least one embodiment of the present invention, the material of the spacer layer is not limited, as long as the spacer layer can play the role of blocking ions. For instance, the material of the spacer layer may include at least one of materials such as silicon nitride, silicon oxide, silicon oxynitride or aluminum oxide. Aluminum oxide has very high density and can effectively isolate ions, so that the ions in the electrochromic units (the electrochromic layer) cannot invade into the liquid crystal layer.

At least one embodiment of the present invention provides a display device, which comprises the display panel provided by any foregoing embodiment. For instance, the display device may further comprise a backlight module. The backlight module is disposed on a light incident side of the display panel (for instance, a side of the first substrate away from a second substrate), so as to provide the display panel with light for image display. For instance, the display device may be any product or component with display function such as a tablet PC, a TV, a display, a laptop, a digital album or a navigator. No limitation will be given here in at least one embodiment of the present invention.

At least one embodiment of the present invention provides a method for manufacturing a display panel, which comprises: providing a first substrate; forming an electrochromic layer on the first substrate; forming a spacer layer on the first substrate on which the electrochromic layer is formed; and providing a second substrate, cell-assembling the first substrate and the second substrate, and forming a liquid crystal layer between the first substrate and the second substrate, wherein the spacer layer is formed between the liquid crystal layer and the electrochromic layer. When the display panel is in dark-state display, the electrochromic layer may absorb light incident into the display panel, so as to prevent the light leakage of the display panel and improve the contrast of display images of the display panel. Moreover, the spacer layer can prevent ions in the electrochromic layer from invading into the liquid crystal layer, so as to protect the performance of liquid crystal molecules in the liquid crystal layer, and then the display yield of the display panel can be improved.

Figure 7:
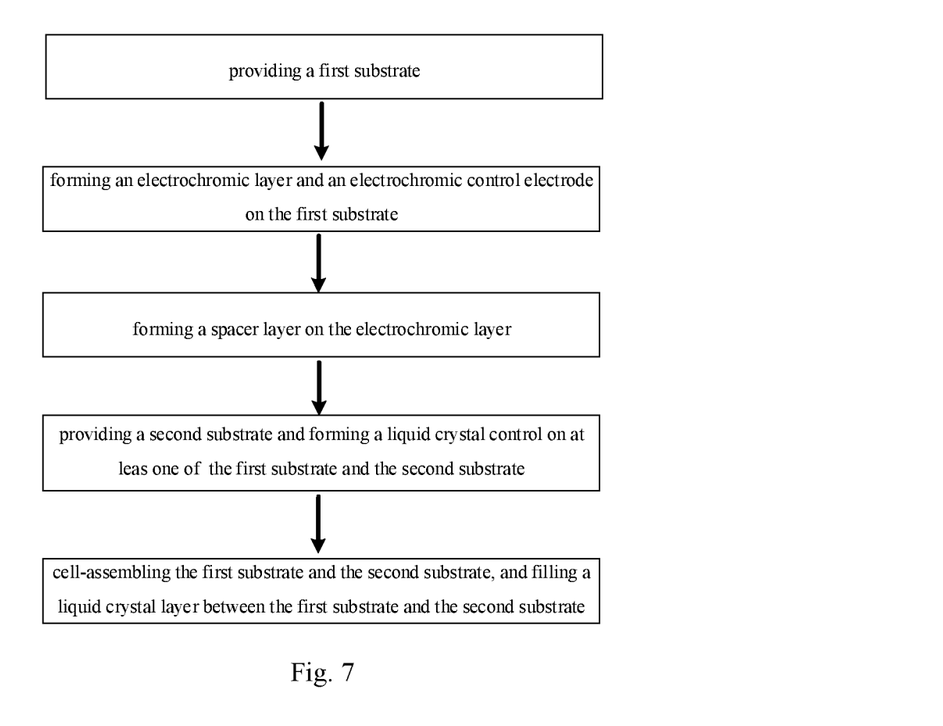
FIG. 7 is a flow chart of a method for manufacturing a display panel provided by an embodiment of the present invention.

FIG. 7 is a flow chart of a method for manufacturing a display panel provided by an embodiment of the present invention. Illustratively, as shown in FIG. 7, the manufacturing process of the display panel may comprise: providing a first substrate; forming an electrochromic layer and an electrochromic control electrode on the first substrate; forming a spacer layer on the electrochromic layer, for instance, the spacer layer covers the electrochromic layer and the electrochromic control electrode; providing a second substrate, and forming a liquid crystal control electrode on at least one of the first substrate and the second substrate; and cell-assembling the second substrate and the first substrate and filling a liquid crystal layer between the first substrate and the second substrate.

For instance, the manufacturing method provided by at least one embodiment of the present invention further comprises: forming a liquid crystal control electrode between the spacer layer and the second substrate; and forming an electrochromic control electrode between the spacer layer and the first substrate, wherein the liquid crystal control electrode is configured to control the electrical field applied to the liquid crystal layer so as to adjust the state of the liquid crystal layer, and the electrochromic control electrode is configured to control the electrical field applied to the electrochromic layer so that the electrochromic layer can switch between the transparent state and the dark-colored state. The liquid crystal control electrode and the electrochromic control electrode are separated by the spacer layer, so as to reduce the parasitic capacitance generated between the liquid crystal control electrode and the electrochromic control electrode or eliminate the parasitic capacitance. Therefore, the interference of the electrochromic control electrode on the electrical field generated by the liquid crystal control electrode can be reduced or eliminated; the control precision on the liquid crystal layer can be improved; and the display effect of the display panel can be improved.

It should be noted that the specific structure of the display substrate obtained by utilization of the above manufacturing process may refer to relevant content in the foregoing embodiments. No further description will be given here in the embodiment of the present invention.

FIGS. 8A-8E are flow drawings of the method for manufacturing the display panel provided by an embodiment of the present invention. Illustratively, as shown in FIGS. 8A-8E, description will be given below to the specific manufacturing method of the display panel provided by at least one embodiment of the present invention by taking the manufacturing of the display panel as shown in FIG. 4 as an example.

Figure 8A:
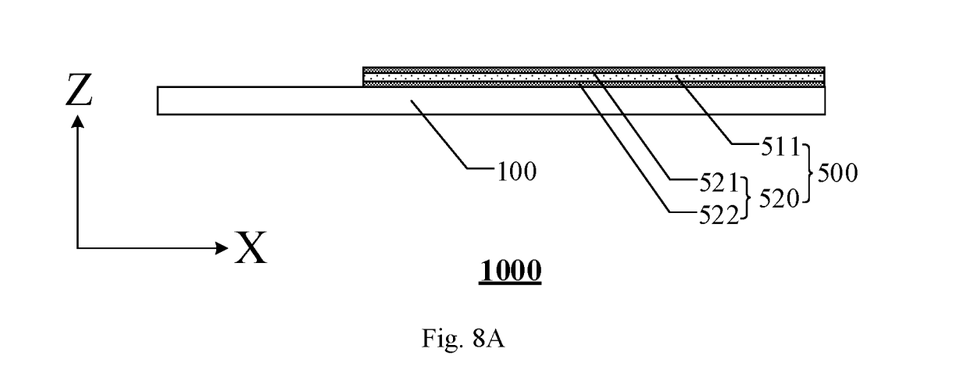
FIGS. 8A-8E are process drawings of the method for manufacturing the display panel provided by an embodiment of the present invention.

As shown in FIG. 8A, a first substrate 100 is provided, and an electrochromic structure 500 is formed on the first substrate. For instance, a second conductive material film, an electrochromic film and a first conductive material film are sequentially deposited on the first substrate 100 and then subjected to a patterning process to form a second electrode 522, an electrochromic layer (e.g., an electrochromic unit 511) and a first electrode 521 which are stacked to the first substrate in sequence.

The first electrode 521, the second electrode 522 and the electrochromic unit 511 may be formed by one patterning process and may also be seperately formed by patterning processes.

For instance, in at least one embodiment of the present invention, the patterning process may be photolithography patterning process, for instance, may include: coating a photoresist layer on a structural layer required to be patterned; performing exposure on the photoresist layer via a mask; obtaining a photoresist pattern by performing development on the exposed photoresist layer; etching the structural layer by adoption of the photoresist pattern; and optionally removing the photoresist pattern. It should be noted that the process of coating the photoresist may be not required if the patterned structural layer includes a photoresist material.

Figure 8B:
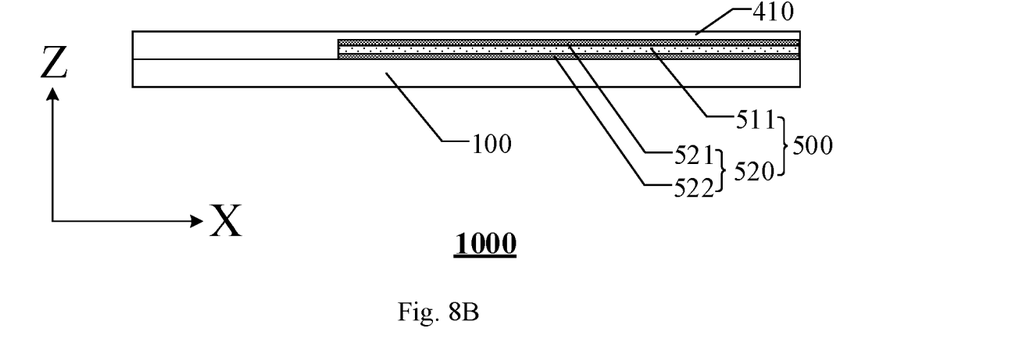

As shown in FIG. 8B, a buffer layer 410 is formed by depositing an insulating material on the first substrate 100 on which the electrochromic structure 500 is formed. The material of the buffer layer 410 may include silicon oxide (SiOx), silicon nitride (SiNx), silicon oxynitride (SiOxNy), etc. For instance, the buffer layer 410 may be a single-layer structure formed by SiNx or SiOx or a two-layer structure formed by SiNx and SiOx. The buffer layer 410 has high density and can prevent the diffusion of harmful impurities, ions and the like in the first substrate 100 or the electrochromic structure 500 (or the electrochromic unit 511).

Figure 8C:
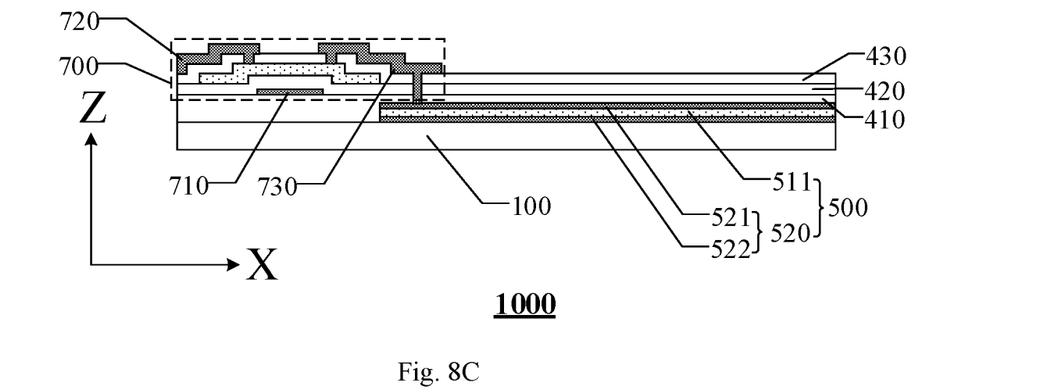

As shown in FIG. 8C, a manufacturing process of a TFT 700 is performed on the first substrate 100. The manufacturing process of the TFT 700 is relevant to the type of the TFT. The manufacturing process of the TFT 700 may refer to the conventional process, so no further description will be given here. For instance, a gate electrode 710, a gate insulating layer 420, an active layer, an interlayer dielectric layer 430 and a source/drain electrode layer (including a source electrode 720 and a drain electrode 730) are sequentially formed on the buffer layer 410. In a process of forming the source/drain electrode layer, through holes may be formed in the buffer layer 410, the gate insulating layer 420 and the interlayer dielectric layer 430, and then a drain electrode 730 of the source/drain electrode layer is connected with the first electrode 521. The material of the gate insulating layer 420 and the interlayer dielectric layer 430 may include SiOx, SiNx or SiOxNy, etc. The gate insulating layer 420 and the interlayer dielectric layer 430 have high density and can prevent ions in the electrochromic unit 511 from invading into the liquid crystal layer.

Figure 8D:
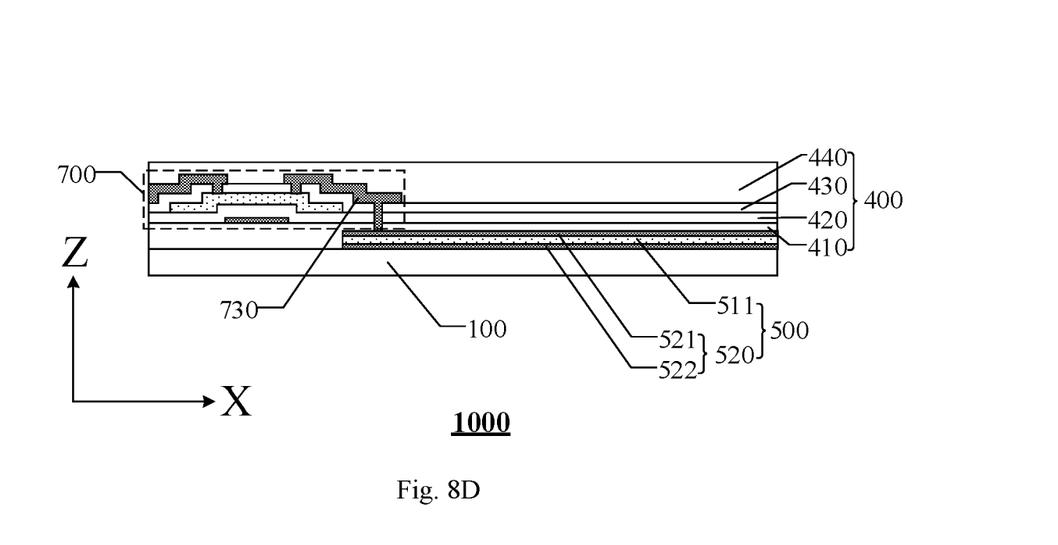

As shown in FIG. 8D, an insulating material film is deposited on the first substrate 100 and is utilized to perform planarization on a surface of the first substrate 100, and then the insulating material film is formed to be a passivation layer 440. The material of the passivation layer 440 may include SiNx, SiOx, acrylic resin, etc. The passivation layer 440 has high density and can prevent ions in the electrochromic unit 511 from invading into the liquid crystal layer.

Figure 8E:
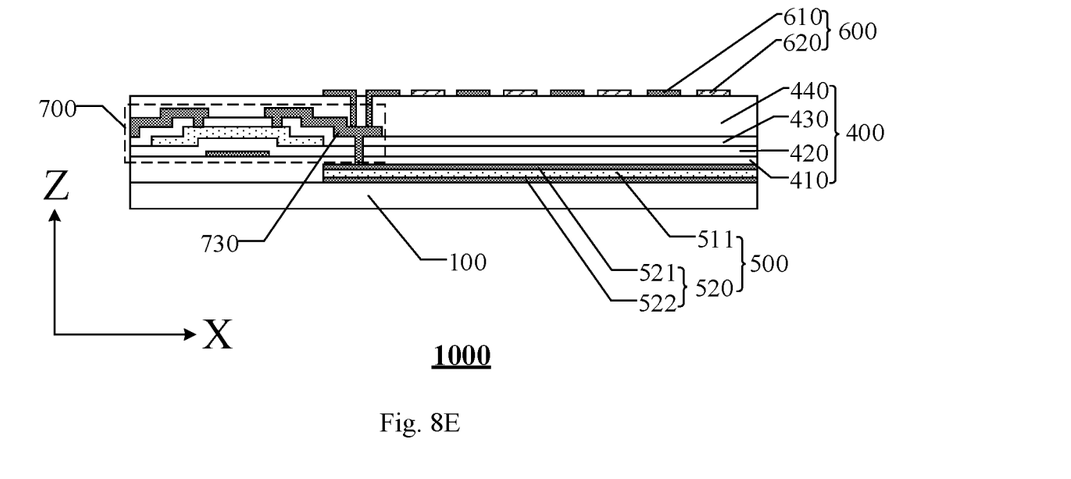

As shown in FIG. 8E, a conductive material film is formed on the passivation layer 440 and then subjected to patterning process to form a pixel electrode 610. For instance, the conductive material film may also be subjected to patterning process to obtain the pixel electrode 610 and a common electrode 620. In a process of forming the pixel electrode 610, through holes may be formed in the passivation layer 440 to connect the pixel electrode 610 and the drain electrode 730 of the TFT 700.

As shown in FIG. 4, cell-assembling process is performed. A liquid crystal layer 300 may be formed on the first substrate; then a second substrate 200 is provided; and the first substrate 100 and the second substrate 200 are cell-assembled in a vacuum environment.

For instance, in at least one embodiment of the present invention, as shown in FIG. 4, an alignment layer 900 may also be formed on at least one side of the liquid crystal layer 300, so as to perform pre-alignment on liquid crystal molecules in the liquid crystal layer. For instance, the alignment layer 900 may be disposed between the liquid crystal layer 300 and the electrochromic unit 511, so the alignment layer 900 can further prevent ions in the electrochromic unit 511 from invading into the liquid crystal layer 300.

Embodiments of the present invention provide a display panel, a manufacturing method thereof and a display device, which may have at least one of the following advantages:

(1) At least one embodiment of the present invention provides a display panel. In the dark-state display of the display panel, the electrochromic layer may absorb light incident into the display panel, so as to prevent the light leakage of the display panel and improve the contrast of the display panel. Moreover, the spacer layer can prevent ions in the electrochromic layer from invading into the liquid crystal layer, so as to protect the performance of the liquid crystal molecules in the liquid crystal layer and improve the display yield of the display panel.

(2) In the display panel provided by at least one embodiment of the present invention, the liquid crystal control electrode and the electrochromic control electrode are separated by the spacer layer, so as to reduce the parasitic capacitance generated between the liquid crystal control electrode and the electrochromic control electrode or eliminate the parasitic capacitance. Therefore, the interference of the electrochromic control electrode on the electrical field generated by the liquid crystal control electrode can be reduced or eliminated; the control precision on the liquid crystal layer can be improved; and the display effect of the display panel can be improved.

(3) In the display panel provided by at least one embodiment of the present invention, at least one of the first electrode or the second electrode may be connected with other electrode structures, signal lines and the like in the display panel to share a signal, so the first electrode or the second electrode, sharing the signal with other structures, does not need to be additionally wired. Therefore, the structure of the display panel can be simplified, and the complexity of the voltage signal applied to the first electrode or the second electrode can be reduced.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged, that is, the accompanying drawings are not drawn according to the actual scale.

(3) In case of no conflict, features in one embodiment or in different embodiments can be combined.

What are described above is related to the specific embodiments of the disclosure only and not limitative to the scope of the disclosure. The protection scope of the disclosure shall be based on the protection scope of the claims.

The application claims priority to the Chinese patent application No. 201810205748.3, filed Mar. 13, 2018, the disclosure of which is incorporated herein by reference as part of the application.

The invention claimed is:

1. A display panel, comprising:
a first substrate and a second substrate, the first substrate and the second substrate being cell-assembled;
a liquid crystal layer, disposed between the first substrate and the second substrate;
a spacer layer, disposed between the liquid crystal layer and the first substrate; and
an electrochromic layer, disposed between the first substrate and the spacer layer, so that under a condition that a dark-state display of the display panel, the electrochromic layer absorbs light incident into the display panel and prevents the light leakage of the display panel and improves a contrast of display images of the display panel;
an electrochromic control electrode, disposed between the spacer layer and the first substrate and configured to control an electrical field applied to the electrochromic layer;
a plurality of pixel units, defined by a plurality of gate lines and a plurality of data lines; and
a switching thin film transistor, disposed on the first substrate and configured to drive the pixel units to display an image,
wherein the electrochromic layer includes a plurality of electrochromic units, each of the plurality of pixel units is provided with at least one of the plurality of electrochromic units,
in each of the plurality of pixel units, the electrochromic control electrode includes a first electrode and the second electrode, and the electrochromic unit is disposed between the first electrode and the second electrode,
the electrochromic layer and the switching thin film transistor are disposed at an identical side of the liquid crystal layer, and the electrochromic layer is disposed between the first substrate and the switching thin film transistor.

2. The display panel according to claim 1, further comprising:
a liquid crystal control electrode, disposed between the spacer layer and the second substrate and configured to control an electrical field applied to the liquid crystal layer.

3. The display panel according to claim 1, wherein
the plurality of pixel units are in one-to-one correspondence with the plurality of electrochromic units, and each of the plurality of pixel unit includes a display region; and
an orthographic projection of the display region on the first substrate coincides with an orthographic projection of the electrochromic unit on the first substrate; or the orthographic projection of the display region on the first substrate falls within the orthographic projection of the electrochromic unit on the first substrate.

4. The display panel according to claim 1, wherein in each of the plurality of pixel units,
under a condition that a voltage on the first electrode is equal to a voltage on the second electrode, the electrochromic unit corresponding to the pixel unit is in transparent state, and the pixel unit is in bright state; and
under a condition that the voltage on the first electrode is unequal to the voltage on the second electrode, the electrochromic unit corresponding to the pixel unit is in dark-colored state, and the pixel unit is in dark state.

5. The display panel according to claim 1, wherein
in each of the plurality of pixel units, the first electrode is electrically connected with a gate electrode or a drain electrode of the switching thin film transistor.

6. The display panel according to claim 1, wherein
the liquid crystal control electrode includes a pixel electrode and a common electrode,
the first electrode is electrically connected with the common electrode; and in each of the plurality of pixel units,
under a condition that a voltage on the second electrode is equal to a voltage on the common electrode, the pixel unit corresponding to the second electrode is in bright state; and
under a condition that the voltage on the second electrode is unequal to the voltage on the common electrode, the pixel unit corresponding to the second electrode is in dark state.

7. The display panel according to claim 1, wherein
a surface of the spacer layer away from the first substrate is a plane.

8. The display panel according to claim 7, wherein
the spacer layer includes at least one of a buffer layer, a gate insulating layer, an interlayer dielectric layer, a passivation layer or a planarization layer.

9. The display panel according to claim 7, wherein
a thickness of the spacer layer is not less than 300 nm.

10. The display panel according to claim 1, wherein
a material of the spacer layer includes at least one of silicon nitride, silicon oxide, silicon oxynitride or aluminum oxide.

11. A display device, comprising the display panel according to claim 1.

12. The display panel according to claim 1, wherein
a material of the electrochromic unit comprises transition metal oxide, derivatives of the transition metal oxide, redox type compound, metal chelate or conductive polymer.

13. The display panel according to claim 12, wherein the material of the electrochromic unit comprises tungsten oxide (WO3), molybdenum oxide (MoO3), nickel oxide (NiO), iridium oxide (IrOx), viologen, phthalocyanine or polyaniline.

14. A method for manufacturing a display panel, comprising:

providing a first substrate;

forming an electrochromic layer on the first substrate;

forming a spacer layer on the first substrate on which the electrochromic layer is formed, forming an electrochromic control electrode between the spacer layer and the first substrate; and providing a second substrate, cell-assembling the first substrate and the second substrate, and forming a liquid crystal layer between the first substrate and the second substrate, wherein the spacer layer is disposed between the liquid crystal layer and the electrochromic layer, wherein under a condition that a dark-state display of the display panel, the electrochromic layer absorbs light incident into the display panel and prevents the light leakage of the display panel and improves a contrast of the display images of the display panel;

the electrochromic control electrode is configured to control and electrical field applied to the electrochromic layer;

a plurality of pixel units, defined by a plurality of gate lines and a plurality of data lines; and a switching thin film transistor, disposed on the first substrate and configured to drive the pixel units to display an image, wherein the electrochromic layer includes a plurality of electrochromic units, each of the plurality of pixel units is provided with at least one of the plurality of electrochromic units, in each of the plurality of pixel units, the electrochromic control electrode includes a first electrode and a second electrode, and the electrochromic unit is disposed between the first electrode and the second electrode, the electrochromic layer and the switching thin film transistor are disposed at an identical side of the liquid crystal layer, and the electrochromic layer is disposed between the first substrate and the switching thin film transistor.

15. The manufacturing method according to claim 14, further comprising:

forming a liquid crystal control electrode between the spacer layer and the second substrate, wherein the liquid crystal control electrode is configured to control an electrical field applied to the liquid crystal layer so as to adjust a state of the liquid crystal layer, and the electrochromic control electrode is configured to control an electrical field applied to the electrochromic layer so that the electrochromic layer is switchable between the transparent state and the dark-colored state.

\* \* \* \* \*